Figure 1:
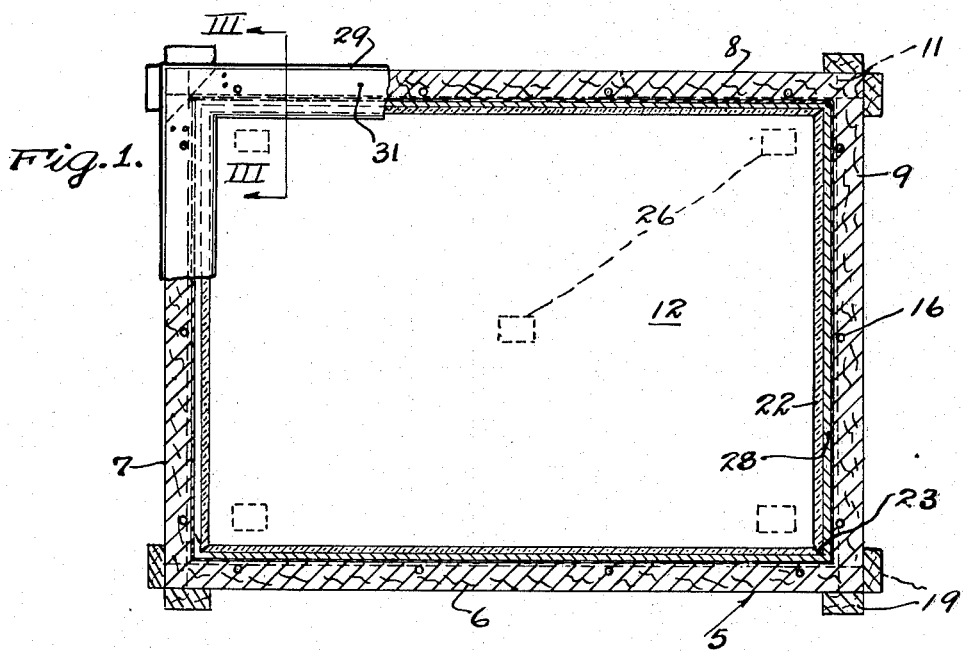

Nov. 28, 1944.    G. L. WEST    2,364,014
GLASS-LINED CONTAINER
Filed June 9, 1943    2 Sheets-Sheet 1

Inventor
GEORGE L. WEST
By Olen E. Bee
Attorney

Nov. 28, 1944.   G. L. WEST   2,364,014
GLASS-LINED CONTAINER
Filed June 9, 1943   2 Sheets-Sheet 2

Inventor
GEORGE L. WEST
By Olen E. Bee
Attorney

Patented Nov. 28, 1944

2,364,014

UNITED STATES PATENT OFFICE 2,364,014

GLASS-LINED CONTAINER

George L. West, Pittsburgh, Pa., assignor to Pittsburgh Plate Glass Company, Allegheny County, Pa., a corporation of Pennsylvania Application June 9, 1943, Serial No. 490,131

8 Claims. (Cl. 206—2)

The present invention relates to containers for acids and other corrosive substances, and it has particular relation to containers comprising inner linings of glass plates and outer reinforcing shells of wood with an intermediate bonding layer of an asphaltic composition.

One object of the invention is to provide a container of the above-indicated type in which the formation of froth and foam in the introduction of the asphaltic layer between the glass lining and the reinforcing shell is substantially obviated.

A second object of the invention is to provide a container construction of the above-indicated type, which is simple, rugged and durable.

These and other objects will be apparent from consideration of the following specification and drawings.

It has been proposed to form tanks or containers for acids and other corrosive substances by lining wooden boxes or vats with sheets or plates of glass bonded to the wood by means of a layer of asphalt. Ordinarily the lining is supported in spaced relation to the inner walls of the outer wooden container and the asphalt in molten state is poured into the space between the walls to provide a packing between the glass and the wood and also effectively to seal the joints between the various units of glass constituting the lining. Difficulty has heretofore been experienced in pouring the molten asphalt into place, because of a very strong tendency of the molten material to foam in the pouring operation. Obviously the production of such foam seriously interferes with operations because it may run over and thus become quite messy. Also, bubbles may be permanently entrapped in the asphalt layer, thus producing points of weakness therein. Furthermore, porous asphalt tends to settle or pack, thus leaving the space only partially filled and the joints only partially sealed.

In accordance with the provisions of the present invention it has been found that the production of foam in the pouring of the intermediate asphalt layer can be eliminated if the inner surface of the container is first covered with a protective material, such as a layer of window glass that will prevent contact between the surface of the wood and the molten asphalt. The latter material may then be poured between the glass sheets.

For a better understanding of the invention reference may now be had to the drawings in which like numerals refer to like parts throughout.

Figure 2:
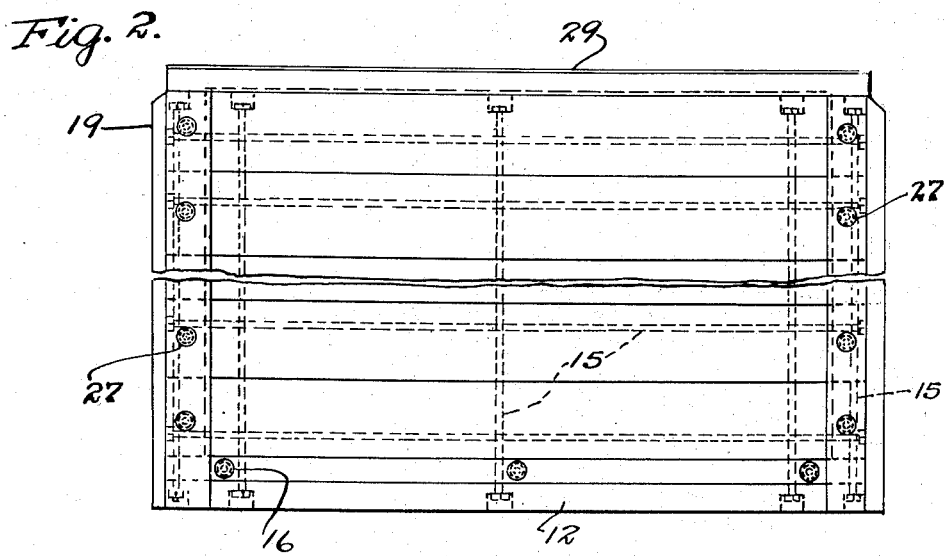
Figure 5:
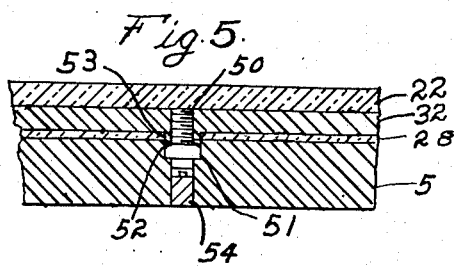
Figure 3:
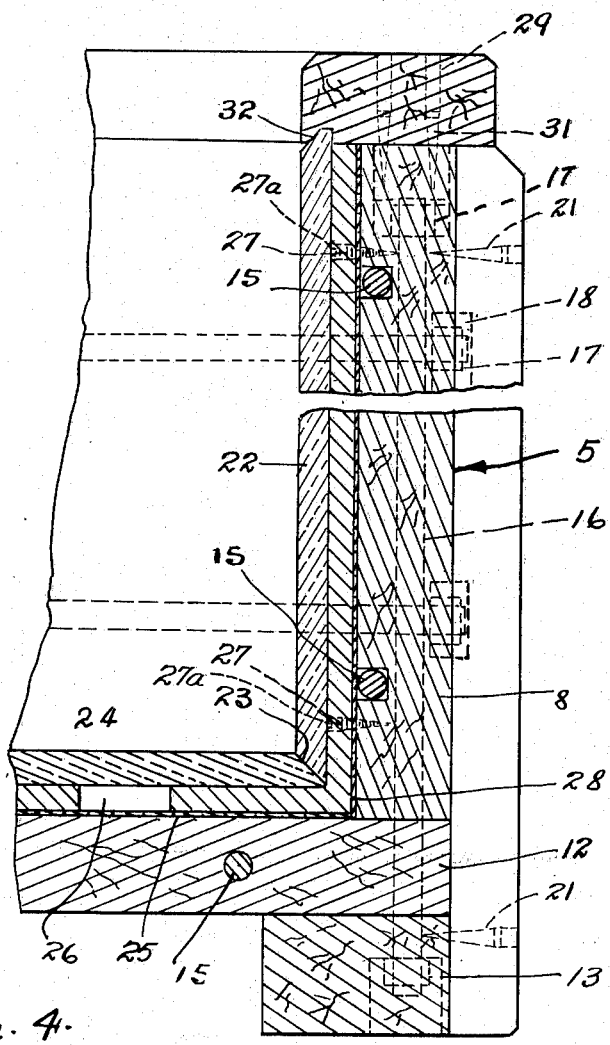
Figure 4:
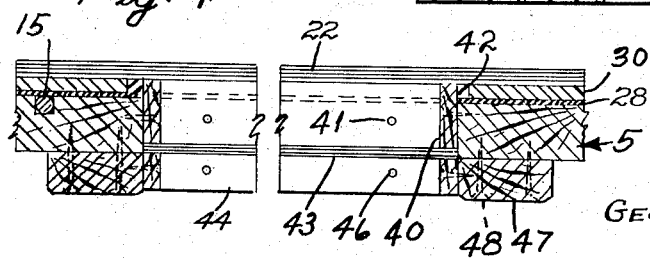

In the drawings Fig. 1 is a view partially in section and partially in plan of a tank or container constructed in accordance with the provisions of the invention; Fig. 2 is an elevational view of the construction shown in Fig. 1; Fig. 3 is a sectional view taken substantially upon the line III—III of Fig. 1; Figs. 4 and 5 are fragmentary sectional views of modified details of construction.

In the construction shown, an outer shell or case 5, preferably of wood and of rectangular, circular, or polygonal section, is provided. It includes side walls 6, 7, 8 and 9, the ends of which are appropriately rabbeted together as indicated at 11. It also includes a bottom 12 having external cleats 13 along two opposed edges. The case is reinforced by horizontal metallic rods 15 and vertical rods 16, which, as indicated in Fig. 3, are provided with nuts 17 that can be tightened in order to apply pressure upon the wood. These nuts are countersunk as indicated at 18 and preferably are covered by bars 19, which, as shown in Fig. 1, constitute corner strips. They may be secured in position by means of screws or other suitable fastenings 21 having heads countersunk below the surface of the bars.

In order to protect the wood and also to prevent leakage of fluids in the container a suitable lining is provided. This lining includes inner plates 22 preferably of glass, each of which is of a size to constitute an inner wall, and which may be ground and polished or which if preferred may have their natural surfaces. These plates may be fairly thick and tempered or heat-treated in order to increase the strength thereof.

The plates, as shown in Fig. 1, have inwardly beveled vertical edges 23, that lock the plates from inwardly collapsing. The edges may be sealed with thermosetting resin, such as Bakelite. Bottom plates 24 and 25 are also provided and are maintained in spaced relation by means of small pieces 26 of glass laid loosely upon the bottom. The plates 22 may be suitably spaced from the side walls 6, 7, 8 and 9 by means of spacing screws 27, threaded into the side walls to such depth as to leave inwardly projecting portions corresponding in length to the desired spacing of the plates. Slots 27a for a screw driver are formed in the threads of the screws to facilitate their insertion.

Next to the walls of the wooden container are glass plates 28, which preferably are relatively thin and may be ordinary window glass or other inexpensive form of flat glass that can contact with the wood. The spacing screws 27 may pass through holes in these plates; or they may pass through the joints between contiguous plates. In the latter case the edges or corners may be slightly nicked to afford room for the screws. The heads of the screws anchor the packing of asphalt and they may act as rosettes to clamp the plates 28. The joints and/or openings in the plates 28 may, if desired, be sealed with thermosetting resin.

It is to be observed that a substantial space is left between the plates 22, 24 and the plates 25, 28, and this space in accordance with provisions of the present invention is run full of hot mastic composition 30, e. g., a composition of asphalt or plasticized sulfur, which at a temperature of about 350° F. or 400° F. is comparatively fluid and can be run into the space between the inner and outer sheets of glass by a mere pouring operation. The asphalt, even at these elevated temperatures, it is found, can be poured in place between the glasses without any tendency to foam.

The upper edges of the assembly are secured and protected by means of coping strips 29, which are fastened in place by means of screws 31, threaded into the upper edges of the wall. These coping strips have grooves 32 formed contiguous to their inner edges and are adapted to receive the upper edges of the inner glass sheets 22. If desired, these edge portions may be beveled by grinding.

The construction as shown is comparatively simple and rugged. The glass and asphalt layers provide complete and adequate coverage for the wooden surfaces. The wood reinforces the glass and the asphalt provides a combined bonding and packing that effectively transmits stresses upon the glass to the wood. The outer sheet or covering of glass 28 effectively obviates the frothing or foaming of the asphalt during the pouring operation and therefore eliminates any flaws or bubbles in the asphalt in the completed structure, and also prevents substantial settling of the asphalt as it cools or after it is cold.

In Fig. 4 is shown a suitable observation window for use in the tank wall. In this construction an opening is formed in shell 5, the edges of the opening being reinforced and defined by a frame 40 of wood held in place by screws 41. In order to prevent possibility of leakage of asphalt, a ring 42 of a thermosetting resin may be filled between plates 22 and 28.

As a safety feature to prevent escape of the contents of the tank in event of breakage of glass 22 a second plate or a series of plates 43 of tempered or annealed glass is provided and its margins sealed against ring 40. It may be locked in place by ring or frame 44, held by screws 46 so that the glass can be removed for cleaning or repair. The opening in the wall is reinforced by frame 47, which also provides securing means for frame 44. Frame 47 is held in place by screws 48, threaded into shell 5.

In Fig. 5 is disclosed a modified construction for holding plate 22 in spaced relation with respect to plate 28. It involves a round pointed set screw 50, threaded through a square hole 52 in shell 5. The screw extends through opening 53 in plate 28 so that its point bears on the back of plate 22. These screws may be accurately positioned after plate 22 is inserted. The rear ends thereof may be covered and protected by plugs 54 of wood or the like.

The form of the invention herein shown and described is to be considered merely as exemplary. It will be apparent to those skilled in the art that numerous modifications may be made therein without departure from the spirit of the invention or the scope of the appended claims.

What I claim is:

1. A container for corrosive substances comprising an outer case of wood and two inner linings of glass, one lining being in contact with the wood and the other lining being substantially spaced, the space between the two linings being filled with an asphaltic composition, which when molten and in contact with wood normally tends to produce foam.

2. A container for acids and similar corrosive liquids comprising, an outer shell of wood, an outer lining of glass plates within the shell, an inner lining of glass plates having walls slightly spaced from the outer lining, the space between the two linings being completely filled with non-porous asphalt, adhering to the glass surfaces, the edges of the upper edges of the container being covered by coping of wood, secured to the edges of the outer shell and covering the edges of glass linings and the intermediate thickness of asphalt.

3. A construction as defined in claim 2 in which the plates of the inner and outer linings are spaced by means of screws threaded into the wooden shell and having heads projecting to engage the inner linings.

4. A construction as defined in claim 2 in which the plates of the inner and outer linings are spaced by means of screws threaded into the wooden shell and having heads projecting to engage the inner linings, said screws having head portions anchoring the asphalt and clamping the plates of the outer lining.

5. A container as defined in claim 2 in which the container is rectangular in horizontal section, and the inner lining comprises plates, each of which covers a wall of the container, the vertical edges of the plates being beveled inwardly so that they are locked from collapsing inwardly.

6. A container for corrosive substances comprising an outer case of wood and two linings of glass, one lining being in contact with the wood and the other being substantially spaced therefrom and a filling of an impermeable corrosion resistant plastic between the two.

7. A construction as defined in claim 6 in which the second lining is of tempered glass.

8. A container for corrosive substances comprising an outer case of wood and an inner and an outer lining of glass plates, one lining being in contact with the wood and the other being substantially spaced from the first lining, a filling of impregnable corrosion resisting plastic between the two, and spacing screws maintaining the spaced relationship of the inner and outer linings, said screws being threaded through a nut embedded in the case and having their rear extremities accessible from the outside of the case, the points of the screws being in contact with the rear faces of the inner lining.

GEORGE L. WEST.